US006596991B1

(12) United States Patent
Yoshida et al.

(10) Patent No.: US 6,596,991 B1
(45) Date of Patent: Jul. 22, 2003

(54) ISOTOPOMER MASS SPECTROMETER

(75) Inventors: Naohiro Yoshida, Sagamihara (JP); Kouichi Kimura, Koganei (JP); Hideaki Koizumi, Tokyo (JP); Yoshiaki Kato, Mito (JP); Minoru Sakairi, Tokorozawa (JP)

(73) Assignees: Hitachi, Ltd., Tokyo (JP); Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/890,063

(22) PCT Filed: Feb. 9, 2000

(86) PCT No.: PCT/JP00/00699

§ 371 (c)(1),
(2), (4) Date: Jul. 26, 2001

(87) PCT Pub. No.: WO00/49640

PCT Pub. Date: Aug. 24, 2000

(65) Prior Publication Data

(65)

(30) Foreign Application Priority Data

Feb. 18, 1999 (JP) .......................................... 11-039456

(51) Int. Cl.[7] .......................... H01J 49/32; G01N 27/62

(52) U.S. Cl. ....................................................... 250/296

(58) Field of Search ................................ 250/281, 282, 250/283, 294, 296

(56) References Cited

U.S. PATENT DOCUMENTS 5,608,216 A * 3/1997 Wells et al. ................ 250/282

FOREIGN PATENT DOCUMENTS

| | | | | |
|---|---|---|---|---|
| JP | 50-122984 | | 9/1975 | |
| JP | 57-53053 | | 3/1982 | |
| JP | 58-19848 | | 2/1983 | |
| JP | 64-84556 | | 3/1989 | |
| JP | 03-108656 | * | 5/1991 | .......... G01N/27/62 |
| JP | 5-142151 | | 6/1993 | |
| JP | 05-174783 | * | 7/1993 | .......... G01N/27/62 |
| JP | 9-72882 | | 3/1997 | |

* cited by examiner

*Primary Examiner*—Huan Tran
(74) *Attorney, Agent, or Firm*—Mattingly, Stanger & Malur, P.C.

(57) ABSTRACT

The analysis of isotopomers is conveniently performed using a double focusing high mass resolution magnetic mass spectrometer comprising an electric field and a magnetic field by a constant accelerating voltage slightly less than the accelerating voltage corresponding to the masses of the ions comprising the majority of a sample to be analyzed, and scanning part of an ion accelerating voltage so that it varies within a range effectively corresponding to the masses of the ions of isotopomers of the ions comprising the majority of the sample to be analyzed.

4 Claims, 8 Drawing Sheets

ISOTOPOMER MASS SPECTROMETER

BACKGROUND OF THE INVENTION

This invention relates to a mass spectrometer device for measuring isotopomers precisely. An isotopomer is a molecular species comprising an isotope in the molecule. About 10 types of isotopomers exist in greenhouse gas due to combinations of elements and inner atomic positions, and the number increases exponentially in polymers such as those found in organic compounds from living things on the ocean floor and on the land.

A method has been proposed, as disclosed for example in Japanese Patent Hei 3-52180, which not only applies a polarizing magnetic field to target ions, but also applies a toroidal electric field and stigmatic second order double focusing to perform efficient analysis. The resulting ion analysis offers high sensitivity and stable performance for various types of ions.

However, insufficient consideration had been given to the precise and convenient measurement of isotopomers.

The analysis of isotopomers is generally performed as follows.

An unknown sample and a standard are converted to gaseous molecules, and these are introduced into a mass spectrometer where they are ionized by electron impact. In this case, to compare their ion currents, the unknown sample and the standard are introduced to the ion source alternately in short time intervals. A mass analysis is then performed by a magnetic sector-type mass spectrometer having an orbital radius of the order of 5–20 cm. The mass spectrometer employs multiple collectors, the abundance ratios of molecular species including isotopes being detected by the ion currents detected by these collectors.

In the mass analysis of isotopomers, a δ value is usually used to represent the isotope content of the sample. The δ value represents the difference of an isotope ratio relative to a standard by a permillage (%). Taking oxygen as an example, this is given by the following equation (1).

$$\delta^{18}O = \left\{ \frac{\left(\frac{^{18}O}{^{16}O}\right)_{Sample} - \left(\frac{^{18}O}{^{16}O}\right)_{SMOW}}{\left(\frac{^{18}O}{^{16}O}\right)_{SMOW}} \right\} \times 10^3 \ (\%) \quad (1)$$

Here, SMOW is an abbreviation for standard Men Ocean Water, and is used worldwide as a standard sample for oxygen and hydrogen.

The ion current introduced into the multiple collectors is measured by the direct method. For example, in the case of $CO_2$ gas, ions having an m/e (mass/charge)=44 are $CO_2^+$, and as they are much more abundant than ions of other m/e values, an ion current $I_1$ (m/e=44) incident on the first collector is stronger by an order of magnitude than an ion current $I_2$ (m/e=45) incident on the second collector. These are read directly for both the standard gas and the sample gas, and the δ value is calculated from their ratio.

$$\delta_m = \frac{\frac{I_2}{I_1} - \left(\frac{I_2}{I_1}\right)_{wst}}{\left(\frac{I_2}{I_1}\right)_{wst}} \times 10^3 \ (\%) \quad (2)$$

Here, the suffix WST refers to a standard used in the laboratory.

SUMMARY OF THE INVENTION

In the magnetic type single focusing mass spectrometer have multiple collectors which was previously used for the mass analysis of isotopomers, the mass resolution was extremely low, being only of the order of 100 to 200. In a mass spectrometer having only this degree of mass resolution, in the case of dinitric oxide ($N_2O$) for example, it is impossible to separately detect $^{14}N^{15}N^{16}O$ (molecular weight 44.99809760) and $^{14}N_2{}^{17}O$ (molecular weight 45.0052790). In other words, the mass spectrometry of isotopomers could not be performed.

As an example of the mass resolution required for the mass spectrometry of isotopomers, Table 1 shows results calculated from data in the scientific annals of the National Astronomical Observatory of Japan in the case of methane, dinitric oxide and nitric oxide.

TABLE 1

| Molecule | Component atoms Molecular weight | | | Required resolution |
|---|---|---|---|---|
| $CH_4$ | $^{12}CH_4$ 16.0313002 | $^{12}CH_3D$ 17.03757692 | $^{13}CH_4$ 17.03465496 | 5818 |
| $N_2O$ | $^{14}N_2{}^{16}O$ 44.0010626 | $^{14}N_2{}^{17}O$ 45.005279 | $^{14}N^{15}N^{16}O$ 44.99809760 | 6266 |
| NO | $^{14}N^{16}O$ 29.9979882 | $^{14}N^{17}O$ 31.0022050 | $^{15}N^{17}O$ 30.9950236 | 4317 |

This table shows combinations of component elements and molecular weights for these molecules. As seen from the table, there is very little difference in molecular weights, and it is easily appreciated that a high mass resolution is required to detect them separately.

In the above Table 1, only molecular weights are shown, but another problem is that the abundances of these ions are very different. As an example, Table 2 shows the abundance ratios of isotopomers for the molecule $N_2O$. This data was calculated from the data in the aforesaid scientific annals.

TABLE 2

| Molecule | Component atoms Abundance ratio (%) | | |
|---|---|---|---|
| $N_2O$ | $^{14}N_2{}^{16}O$ 99.032 | $^{14}N_2{}^{17}O$ 0.03653 | $^{14}N^{15}N^{16}O$ 0.7256 |

If the single focusing mass spectrometer having multiple collectors of the prior art were to have a high mass resolution, for example 10,000 or higher, it would be a very large device wherein the distance between the ion source of the mass spectrometer and the detector was of the order of several tens of meters. Further, as it would not be able to deal with extreme differences of abundance ratios, it would not be practically feasible.

To perform the mass analysis of isotopomers, this invention is based on the double focusing mass spectrometer disclosed in Japanese Patent Hei 3-52180. For simple analysis of molecules comprising stable isotopes of the same element, part of the ion accelerating voltage is scanned. For the analysis of isotopomers with different elements, the magnetic field intensity is changed to a value corresponding to the particular element before part of the ion accelerating voltage is scanned. For extreme differences of abundance ratios, an amplifier is also used for signal detection wherein the gain is varied according to the abundance ratio.

DESCRIPTION OF THE PREFERRED EMBODIMENTS

Figure 1:
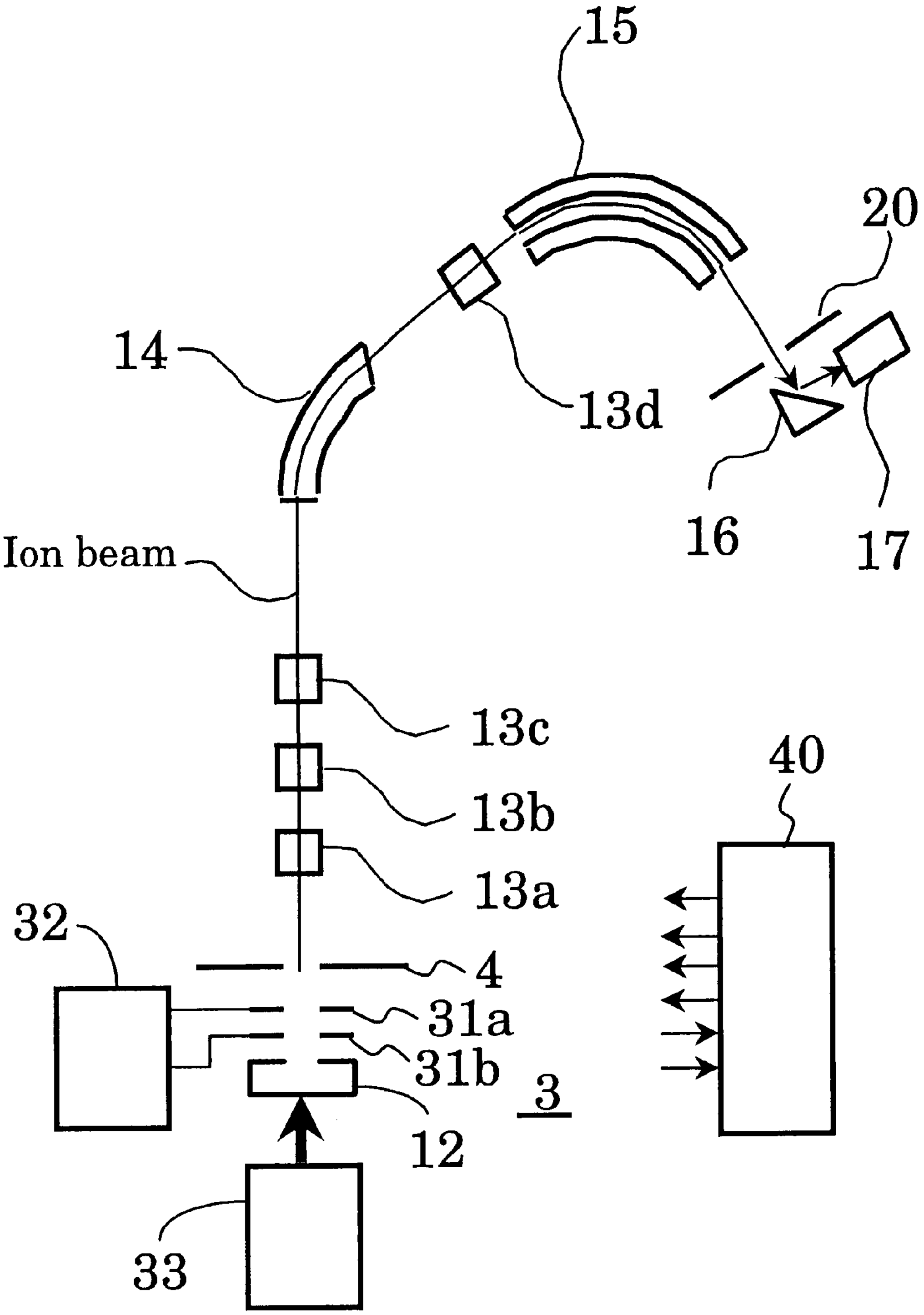
FIG. 1 is a block diagram showing an embodiment of this invention based on the construction of a double focusing mass spectrometer.

An embodiment of this invention will be described referring to FIG. 1. FIG. 1 is a block diagram showing one embodiment of this invention, and is based on the construction of the double focusing mass spectrometer disclosed in Japanese Patent Hei 3-52180.

In FIG. 1, 3 is an ionization source chamber comprising an ionization source 12 which ionizes an introduced sample, and lens electrodes 31*a*, 31*b* which focus the ions. The lens electrodes may be more numerous if necessary. 33 is a sample introduction part which alternately supplies a standard and a sample to be analyzed to the ionization source 12. 32 is a lens power supply which supplies a required voltage to the lens electrodes 31*a*, 31*b*. 4 is a slit used for guiding accelerated ions into a specific region. 13*a*–13*d* is an electrostatic quadruple lens situated in the passage of the ion beam, which focuses or diverges the ion beam. 14 is a magnetic field coil disposed in the passage of the ion beam, 15 are electric field electrodes disposed in the passage of the ion beam, and 20 is a slit disposed in the passage of the ion beam. Ions which have passed through the slit 20 strike the surface of a conversion dinode (at a potential of the order of −15 kV) 16 formed of a material such as aluminum or the like, and generate secondary electrons which are detected by an ion detector 17. 40 is a total controller essentially comprising a computer, which has functions to control the voltages supplied to the various instruments or control the introduction of the sample to be ionized, and to analyze the output of the ion detector 17.

Here, the electrostatic quadruple lens 13*a*–13*d*, magnetic field coil 14 and electric field coil 15 disposed in the passage of the electron beam are maintained at voltages such that when ions of the sample are discharged from the slit 4 at a predetermined accelerating voltage, the ions are detected most efficiently by the ion detector 17. The construction and control of these devices, the overall construction required to maintain the ion beam passage under a vacuum and the gas discharge system, the sample introduction part 33, and the construction and control of the ion source 12, may be identical to those of the prior art and their description will therefore be omitted.

It is a feature of this invention that the accelerating voltage in the ionization source chamber 3 is a voltage which changes with time. This time variation will be described in the case of embodiments wherein the voltage varies as a sawtooth wave, and wherein the voltage varies in a stepwise manner.

Figure 2:
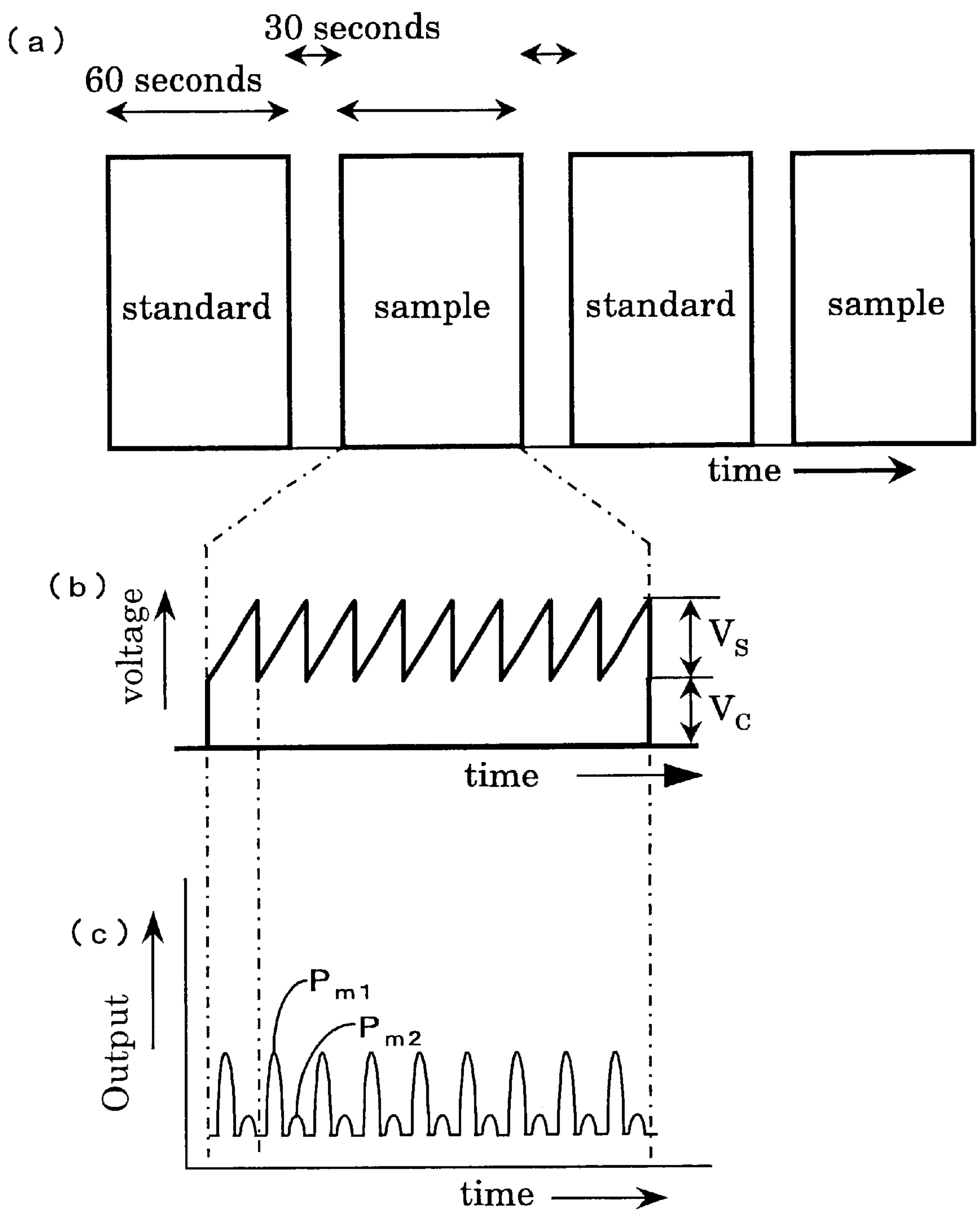
FIG. 2 is a diagram describing an analysis according to this invention.

FIG. 2 is a diagram describing an analysis according to this invention.

As shown in (a), the standard and the sample to be analyzed are introduced to the ionization source 12 from the sample introduction part 33 with an interruption of, for example, 30 seconds every 60 seconds. During the interruption of 30 seconds, the ions in the system are purged by a discharge apparatus to prevent contamination of the standard and the sample to be analyzed.

The accelerating voltage used in the analysis of the sample to be analyzed is shown in (b). As this is identical for the standard, the standard is omitted from the diagram. As shown in (b) , accelerating voltages Vs, Vc are applied to the accelerating electrodes in the ionization source chamber 3. Here, the accelerating voltage Vc is a constant voltage, and its magnitude is slightly less than the accelerating voltage at which ions are detected most efficiently when the sample is ionized and discharged as an ion beam. The accelerating voltage Vs applied to the accelerating electrodes in the ionization source chamber 3 is a voltage which varies as a sawtooth wave based on the constant voltage Vc as shown in the diagram, and its maximum value is slightly larger than the accelerating voltage at which isotopomers that are expected to be contained in the sample can be precisely detected by the ion detector 17 when the sample to be analyzed is ionized and discharged as an ion beam.

(c) is a waveform which schematically shows the detection output obtained from the ion detector 17. A peak value $P_{m1}$ shows the output obtained when the accelerating voltage Vs has reached the magnitude for analyzing the standard. On the other hand, a peak value $P_{m2}$ shows the output obtained when the accelerating voltage Vs has reached the magnitude for analyzing isotopomers. The amount of isotopomers contained in the sample to be analyzed is of course extremely low, so the magnitudes of the two peak values $P_{m1}$, $P_{m2}$ are generally very different.

When the standard is analyzed, only the peak value $P_{m1}$ is obtained, which is the output when the accelerating voltage Vs has reached the magnitude for analyzing the standard, so this case is not shown in the diagram.

In the description, it was assumed that the masses of the isotopomers were heavier than that of the standard, but the setting of the accelerating voltage Vc and scanning range of the accelerating voltage Vs must also be such as to be able to detect isotopomers which are lighter. Also, when it is necessary to perform the mass analysis of plural isotopomers, the setting of the accelerating voltage Vs must also be able to handle the heaviest among them.

Figure 3:
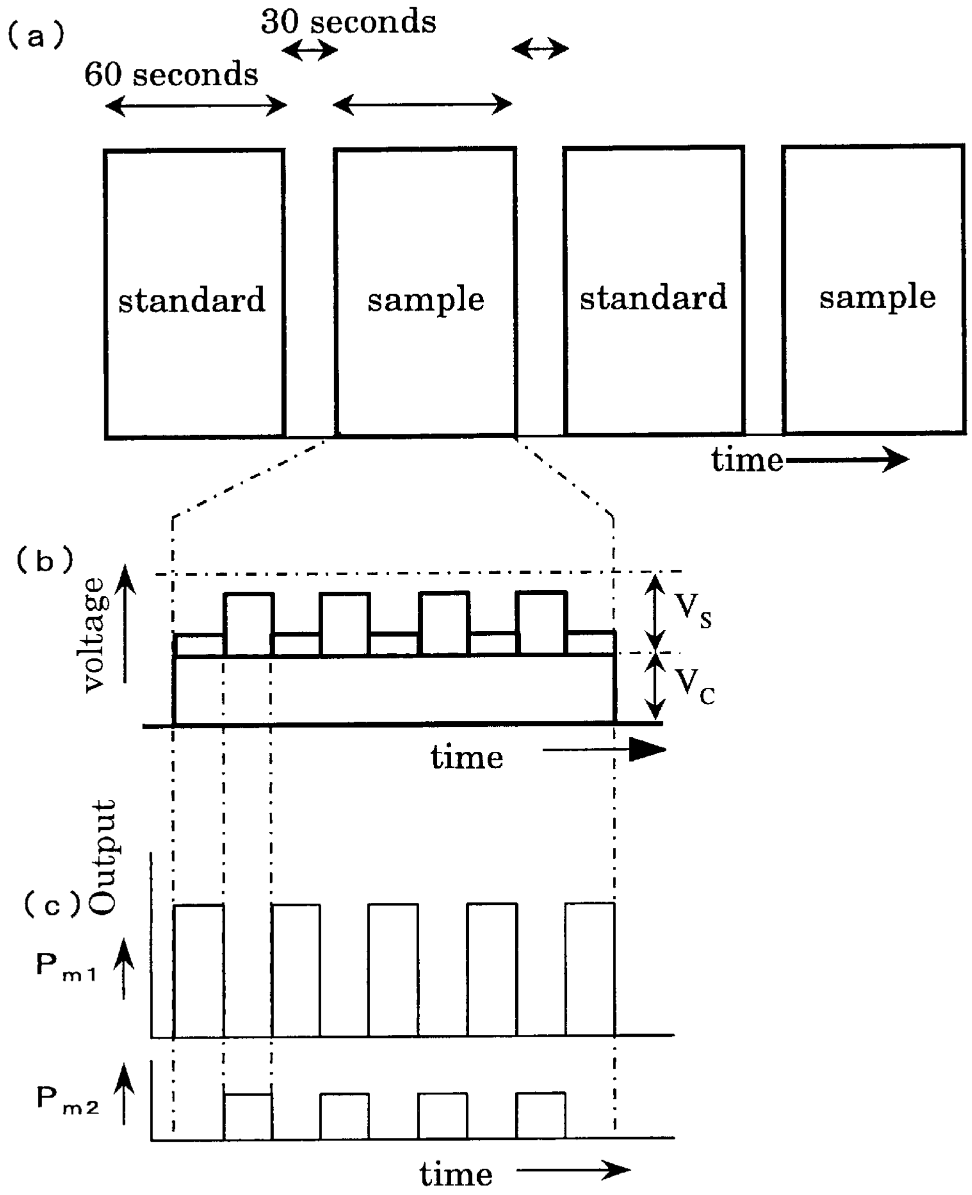
FIG. 3 is a diagram describing another analysis according to this invention.

FIG. 3 is a diagram describing another analysis according to this invention.

As shown in (a), the sample introduction in this case is identical to the described in FIG. 2.

The accelerating voltage during analysis of the sample to be analyzed is shown in (b). As this is identical for the standard, the standard is omitted from the diagram. As shown in (b), a pulse voltage slightly larger than the accelerating voltage Vc and a pulse voltage slightly less than the accelerating voltage Vs are repeatedly applied with an identical period to the sawtooth wave accelerating voltage in FIG. 2. The accelerating voltage Vc is a constant voltage. Here, the magnitude of the pulse voltage which is slightly larger than the accelerating voltage Vc is such that ions can be detected with maximum efficiency when the standard is ionized and discharged as an ion beam. The magnitude of the pulse voltage which is slightly less than the accelerating voltage Vs is such that ions of isotopomers expected to be contained in the sample can be precisely detected by the ion detector 17 when the sample to be analyzed is ionized and discharged as an ion beam. Here also, the accelerating voltage Vs which is applied is a voltage which varies based on the constant voltage Vc, as shown in the diagram.

(c) is a waveform which schematically shows the detection output from the ion detector 17. The pulse value $P_{m1}$ shows the output obtained when the standard is analyzed. The pulse value $P_{m2}$ shows the output obtained when isotopomers are analyzed. According to this embodiment, the accelerating voltage is given by the optimum voltage for detecting isotopomers, so the detection output is not a peak value and is pulse-like. Also, as the amount of isotopomers contained in the sample to be analyzed is extremely low, the magnitudes of the two peaks are of course generally very different.

According to this embodiment, the ion detection efficiency falls sharply if the accelerating voltage is not suited to the molecular species being analyzed, so it is important to set this to the optimum voltage depending on this molecular species. At the same time, if a suitable setting is made, corresponding data can be acquired over a long period, so sufficient data is obtained.

This embodiment was described assuming that the masses of isotopomers were heavier than that of the standard, but the setting of the accelerating voltage Vc and the setting of the accelerating voltage Vs must of course cover also the case where they are lighter. Further, when it is necessary to perform the mass analysis of plural isotopomers, it is necessary to set the accelerating voltage Vs accordingly for each of them.

This invention is concerned with the mass analysis of isotopomers, therefore as described above, in the construction of the system shown in FIG. 1, the electrostatic quadruple lenses 13*a*–13*d*, magnetic field coil 14 and electric field coil 15 disposed in the passage of the ion beam are maintained at voltages such that ions can be detected with maximum efficiency by the ion detector 17 when ions of the standard are discharged from the slit 4 at a predetermined accelerating voltage.

Therefore, to measure molecules having very different molecular weights, the analysis of the molecules $CH_4$, $N_2O$ and NO shown in Table 1 cannot be performed merely by varying the accelerating voltage Vs using the same type of system. In this case, after optimizing the system for each measurement target by the total controller 40, the mass analysis of isotopomers is performed for each of these molecules.

The changes made to the system are voltage modifications to the magnetic field coil 14 and electric field coil 15, and modifications of the accelerating voltages Vc, Vs. If the system is optimized for the molecule to be analyzed, the difference in molecular masses poses no problem, and the mass analysis of isotopomers of the molecule can be performed in an identical way to that described in FIG. 2 and FIG. 3.

Figure 4:
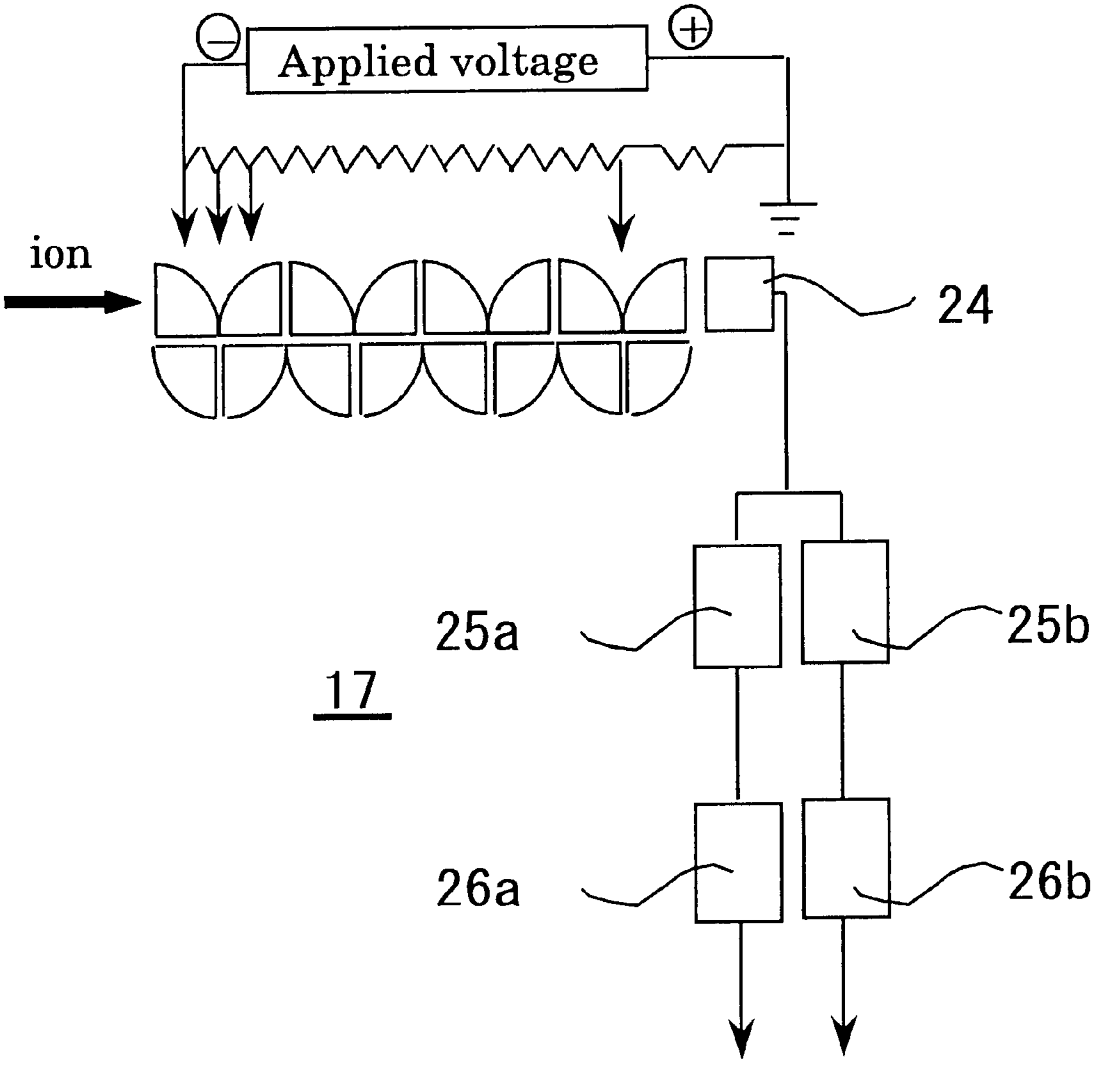
FIG. 4 is a diagram showing an example of an ion detector when the intensities of ions to be compared are very different.

As was mentioned earlier in the case of detection outputs, in the measurement of isotopomers, the intensities of the ions to be compared are often very different. FIG. 4 shows an example where the ion detector is modified to deal with this problem. Specifically, the output amplifier of a current detector 24 of the ion detector 17 may for example have two parts 25*a*, 25*b* whereof the gains are independently varied. When the pulse output $P_{m1}$ in FIG. 2 is detected, a signal from the amplifier of low gain is used, and when the pulse output $P_{m2}$ is detected, a signal from the amplifier of high gain is used. According to this invention, as seen for example from the embodiment of FIG. 2 or FIG. 3, this can be easily done as the signal of either of these amplifiers may be selected corresponding to the setting of the ion accelerating voltage. Thus, even if the original ion intensities are different, signals of approximately the same order can be obtained which is convenient also for calculating isotope ratios. 26*a*, 26*b* were respectively AD converters, however these may be incorporated in the output amplifiers 25*a*, 25*b*, or the conversion may be performed after data is acquired by the total controller 40.

Figure 5:
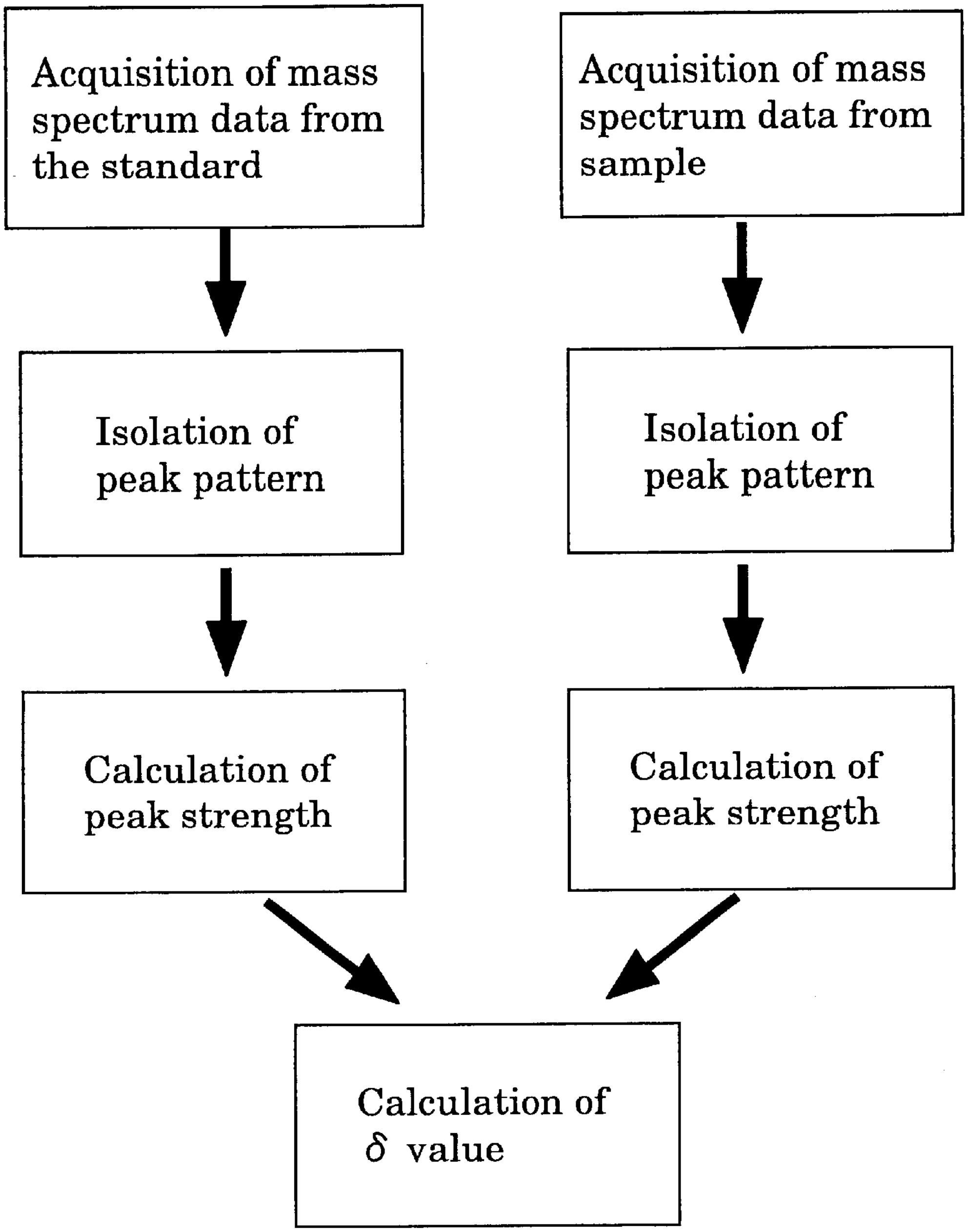
FIG. 5 is a diagram describing a procedure for calculating an isotope relative δ value of an unknown sample relative to a standard from mass spectrum data obtained by measuring the standard and unknown sample.

Next, the procedure for calculating the isotope relative δ value of the sample relative to the standard will be described from mass spectrum data obtained by measuring the standard and sample. FIG. 5 shows the overall flow of this process. First, a peak pattern is isolated and extracted from the mass spectrum data respectively for the standard and the sample. Plural peaks appear corresponding to differences among the isotopes in the molecule. Next, the height or area of the peaks is calculated to quantize the intensities of the peak patterns. The abundance ratio of different isotopes in the molecule is found by calculating the ratio of these peak intensities. The value of this ratio is calculated as the δ value by comparing the standard and the sample.

Figure 6:
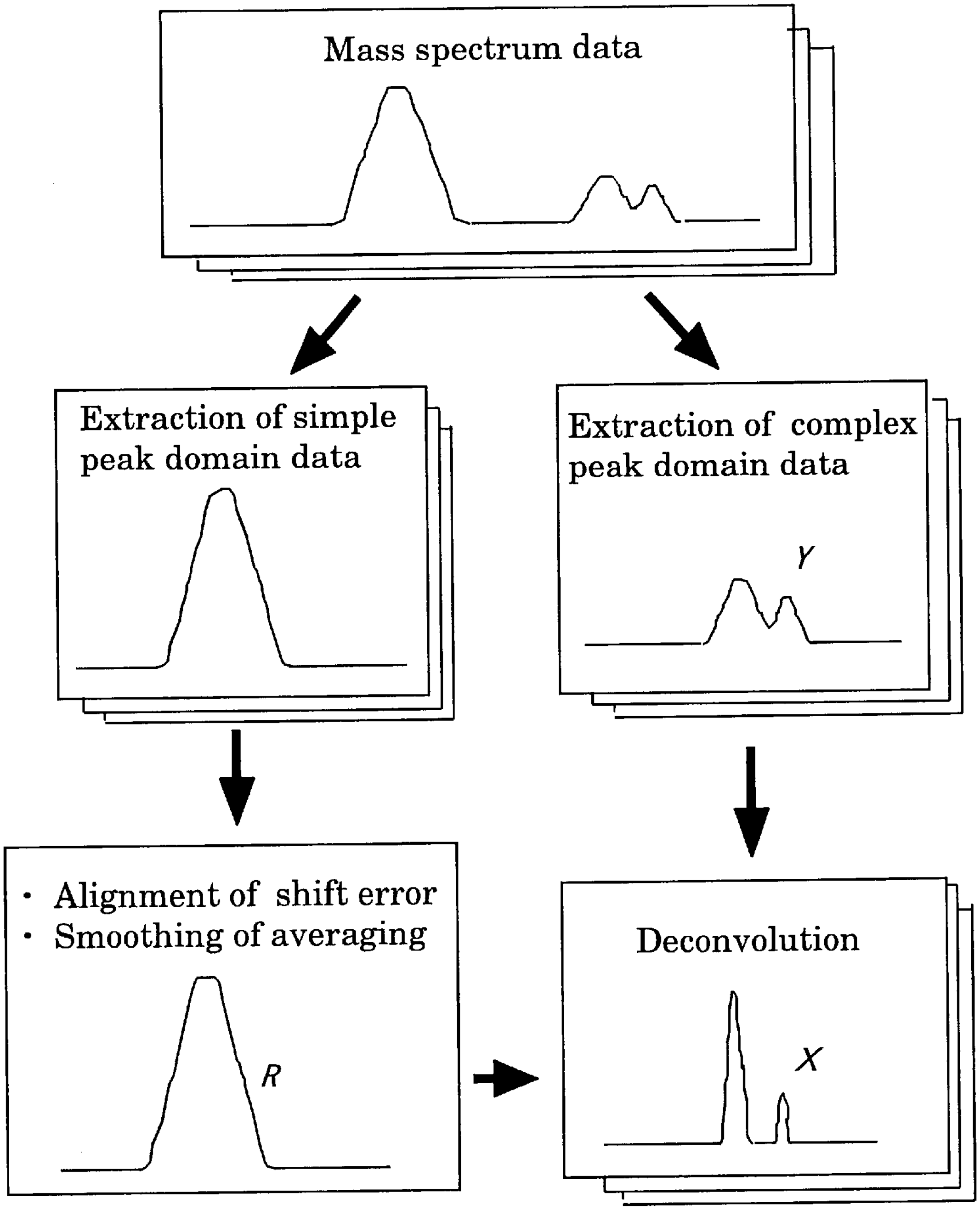
FIG. 6 is a diagram showing a procedure for isolating a peak pattern from mass spectrum data.

FIG. 6 shows the procedure for isolating the peak pattern from the mass spectrum data. As seen from the description of FIG. 2 and FIG. 3, a large amount of mass spectrum data are obtained from one measurement, so this large amount of data is statistically processed. First, the mass range in which the peak pattern is present is extracted from the mass spectrum data. In the peak pattern, there are simple peaks which can be considered as single peaks, and complex peaks which can be considered as plural peaks superimposed on each other. Of these, in the latter case, it is important to separate peaks which are superimposed. Here, the shape of each peak comprising a complex peak is considered to be that of a single peak, and unique to the apparatus. The function representing this shape is the blur function R. The blur function R can be calculated by correcting shift errors on the mass axis from the results of plural scans in the simple peak domain, and smoothing by taking the average. Next, each peak contained therein is isolated from the complex peak pattern by performing deconvolution using this blur function R.

Figure 7:
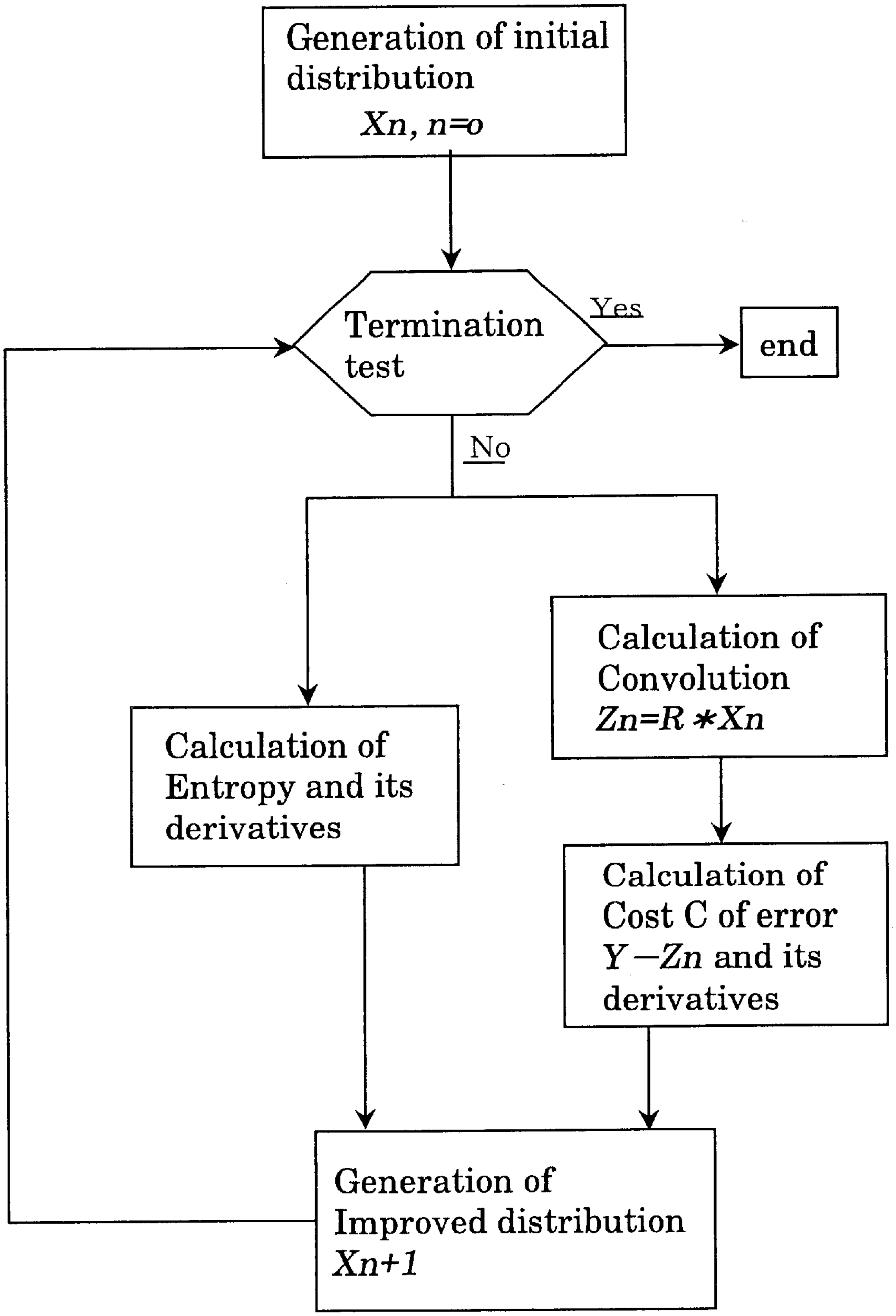
FIG. 7 is a diagram showing a procedure for isolating peaks in complex peak patterns by deconvolution.

FIG. 7 shows the procedure used for isolating peaks contained in a complex peak pattern by deconvolution. A deconvolution calculation is the reverse of convolution, and the law of maximum entropy is used to obtain a unique solution for measurement data which contain noise. In other words, the solution at which the entropy is maximized is selected from solutions matching the measured data, allowing for error considered to be due to noise. The nth solution in the calculation obtained by repeated improvements is given by equation (3).

$X_n=\{X_n(i)\}(3$

Here, i is a subscript in the mass axis direction. First, an initial distribution is suitably generated as shown by equation (4).

$$X_0=\{X_0(i)\} \tag{4}$$

This may be a uniform distribution as shown by equation (5).

$$X_0(i)=\text{constant} \tag{5}$$

In the processing of the nth loop, the entropy of the distribution shown by equation (3) is calculated by equation (6), or the partial derivatives relating to Xn(i) are calculated.

$$\left.\begin{aligned} S &= -\sum_i p_i \log p_i \\ p_i &= \frac{X_n(i)}{\sum_i X_n(i)} \end{aligned}\right\} \tag{6}$$

A convolution $Z_n=R*X_n$ between $X_n$ and the blur function R is calculated, compared with a complex peak pattern Y in the measurement results, the magnitude C of the error $Y-Z_n$ is evaluated, and the partial derivatives relating to the corresponding $X_n$ (i) are calculated in the same way. The solution $X_{n+1}$ in the next loop is calculated by the steepest descent algorithm and conjugate gradient algorithm from the entropy S thus calculated and the slope direction of the magnitude C of the error. By repeating this process, the solution which maximises S-λC is calculated. Here, λ is the Lagrange multiplier. Loop processing is terminated when S-λC is saturated, and the peaks contained in $X_n$ are sufficiently separated.

Figure 8:
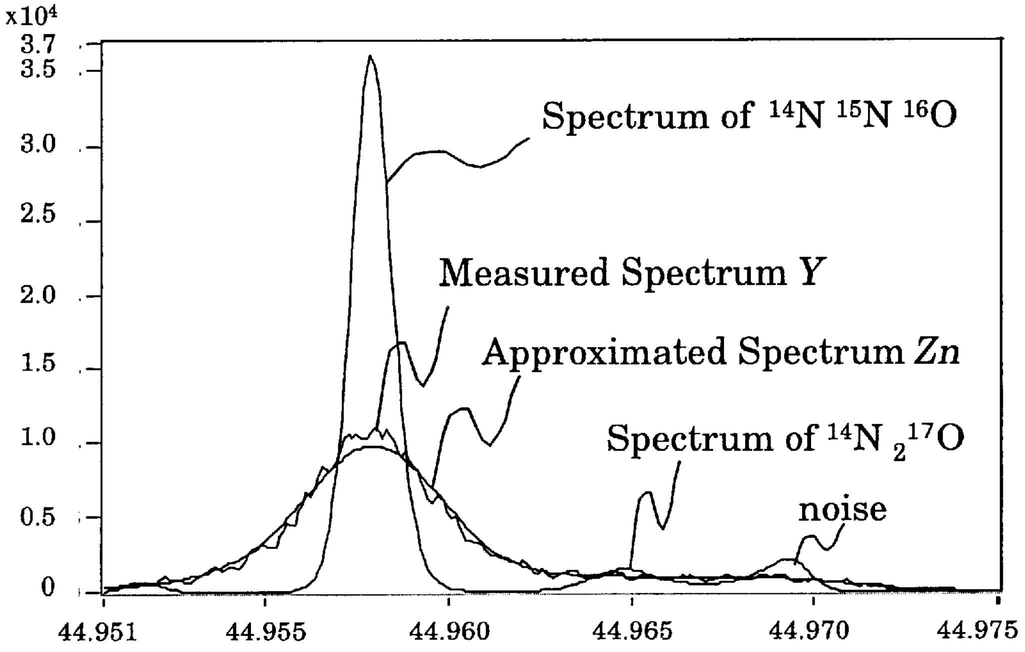
FIG. 8 is a diagram showing an example of analysis results wherein molecular weight is shown on the horizontal axis and abundance is shown on the vertical axis.

FIG. 8 shows an example of this peak isolation. This is an example of a separation between the two isotopomers $^{14}N^{15}N^{16}O$ and $^{14}N_2{}^{17}O$ which have a molecular weight of approximately 45, relative to the molecular weight shown in Table 1 which is approximately 44. The complex peak pattern Y in the measurement spectrum is approximated by the smooth spectrum $Z_n$, and two peaks are isolated therefrom. These peaks respectively correspond to $^{14}N^{15}N^{16}O$ and $^{14}N_2{}^{17}O$. The peak appearing on the right-hand side of the diagram is thought to be noise due to species remaining in the system.

In FIG. 8, molecular weight is shown on the horizontal axis and abundance is shown on the vertical axis, and it is seen from the figure that $^{14}N^{15}N^{16}O$ is more abundant than $^{14}N_2{}^{16}O$. In FIG. 8, however, the molecular weight data on the horizontal axis is not correct as the apparatus used was not sufficiently calibrated.

According to this invention, in addition to performing analysis effectively by stigmatic second order double focusing, measurements can conveniently be made by controlling an ion accelerating voltage corresponding to expected isotopomers.

What is claimed is:

1. An isotopomer mass spectrometer which performs analysis of a sample by stigmatic second order double focusing in conjunction with a polarizing magnetic field and a toroidal electric field in the passage of an ion beam, comprising an ionization source which ionizes the sample, means for supplying said sample to said ionization source, an accelerating electrode for discharging ions in said ion beam passage and an accelerating power supply which repeatedly supplies an ion accelerating voltage to said accelerating electrode, an ion detector comprising a signal amplifier having different gains, and a total controller which controls these devices and processes the detection results, wherein a standard and the sample to be examined are supplied alternately, said accelerating voltage is given by the sum of a constant accelerating voltage slightly less than the accelerating voltage corresponding to the masses of the ions comprising the majority of the analysis sample, and a sawtooth wave accelerating voltage which varies within a range effectively corresponding to the masses of isotopomers of the ions comprising the majority of the analysis sample, the output of said ion detector uses a signal amplifier of high gain for detection of isotopomers and uses a signal amplifier of low gain in other cases, and a δ value corresponding to the difference of isotope ratios of the sample to be examined relative to the standard is computed from the signal intensities of the standard and the sample to be examined.

2. An isotopomer mass spectrometer as defined in claim 1, wherein instead of the sawtooth wave voltage, the accelerating voltage is given by the sum of a rectangular wave voltage effectively corresponding to the masses of the ions comprising the majority of the sample to be analyzed, and a rectangular wave voltage effectively corresponding to the masses of the ions of said isotopomers.

3. An isotopomer mass spectrometer as defined in claim 1, wherein the selection of the output of the signal amplifier is determined mainly by the magnitude of the sawtooth wave voltage.

4. An isotopomer mass spectrometer as defined in claim 1, wherein the selection of the output of the signal amplifier is determined mainly by a timing when the sawtooth wave voltage is a predetermined magnitude.

* * * * *